(12) United States Patent
Ota et al.

(10) Patent No.: US 10,593,952 B2
(45) Date of Patent: Mar. 17, 2020

(54) MECHANICAL SYSTEMS AND METHODS FOR PROVIDING EDGE SUPPORT AND PROTECTION IN SEMI-SOLID ELECTRODES

(71) Applicants: 24M Technologies, Inc., Cambridge, MA (US); Kyocera Corporation, Kyoto (JP)

(72) Inventors: Naoki Ota, Lexington, MA (US); Takaaki Fukushima, Okayama (JP); Ricardo Bazzarella, Woburn, MA (US); Richard Holman, Wellesley, MA (US); Sarah Cole, Somerville, MA (US); Drew Walker, Cambridge, MA (US); Hiuling Zoe Yu, Quincy, MA (US); Taison Tan, Cambridge, MA (US)

(73) Assignees: 24M Technologies Inc., Cambridge, MA (US); Kyocera Corporation, Kyoto (JP)

( * ) Notice: Subject to any disclaimer, the term of this patent is extended or adjusted under 35 U.S.C. 154(b) by 130 days.

(21) Appl. No.: 15/157,843

(22) Filed: May 18, 2016

(65) Prior Publication Data
US 2016/0344006 A1    Nov. 24, 2016

Related U.S. Application Data

(60) Provisional application No. 62/163,658, filed on May 19, 2015.

(51) Int. Cl.
*H01M 4/70* (2006.01)
*H01M 10/0525* (2010.01)
*H01M 4/02* (2006.01)

(52) U.S. Cl.
CPC .......... *H01M 4/70* (2013.01); *H01M 10/0525* (2013.01); *H01M 2004/029* (2013.01)

(58) Field of Classification Search
None
See application file for complete search history.

(56) References Cited

U.S. PATENT DOCUMENTS

| 8,722,226 | B2 | 5/2014 | Chiang et al. |
| 8,722,227 | B2 | 5/2014 | Chiang et al. |
| 8,778,552 | B2 | 7/2014 | Chiang et al. |
| 8,993,159 | B2 | 3/2015 | Chiang et al. |
| 9,153,833 | B2 | 10/2015 | Chiang et al. |
| 9,178,200 | B2 | 11/2015 | Bazzarella et al. |
| 9,184,464 | B2 | 11/2015 | Chiang et al. |
| 9,203,092 | B2 | 12/2015 | Slocum et al. |
| 9,293,781 | B2 | 3/2016 | Chiang et al. |
| 9,362,583 | B2 | 6/2016 | Chiang et al. |
| 9,385,392 | B2 | 7/2016 | Chiang et al. |

(Continued)

*Primary Examiner* — Lucas J. O'Donnell
(74) *Attorney, Agent, or Firm* — Cooley LLP

(57) ABSTRACT

Embodiments described herein relate generally to electrodes for electrochemical cells, the electrodes including an electrode material disposed on a current collector. In some embodiments, an electrode includes an edge protection barrier member on a perimeter of a surface of the current collector. The barrier member forms a wall along the main edge(s) of the current collector, defining an inner region bounded by the barrier member and the top surface of the current collector, and the electrode material occupies the inner region.

22 Claims, 16 Drawing Sheets

(56) References Cited

U.S. PATENT DOCUMENTS

| | | |
|---|---|---|
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 2003/0194605 A1* | 10/2003 | Fauteux .............. H01M 2/26 429/149 |
| 2010/0047671 A1 | 2/2010 | Chiang et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0028071 A1* | 1/2016 | Lev .............. H01M 4/14 429/210 |
| 2016/0042877 A1* | 2/2016 | Kokotov .............. H01G 11/52 361/502 |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |

\* cited by examiner

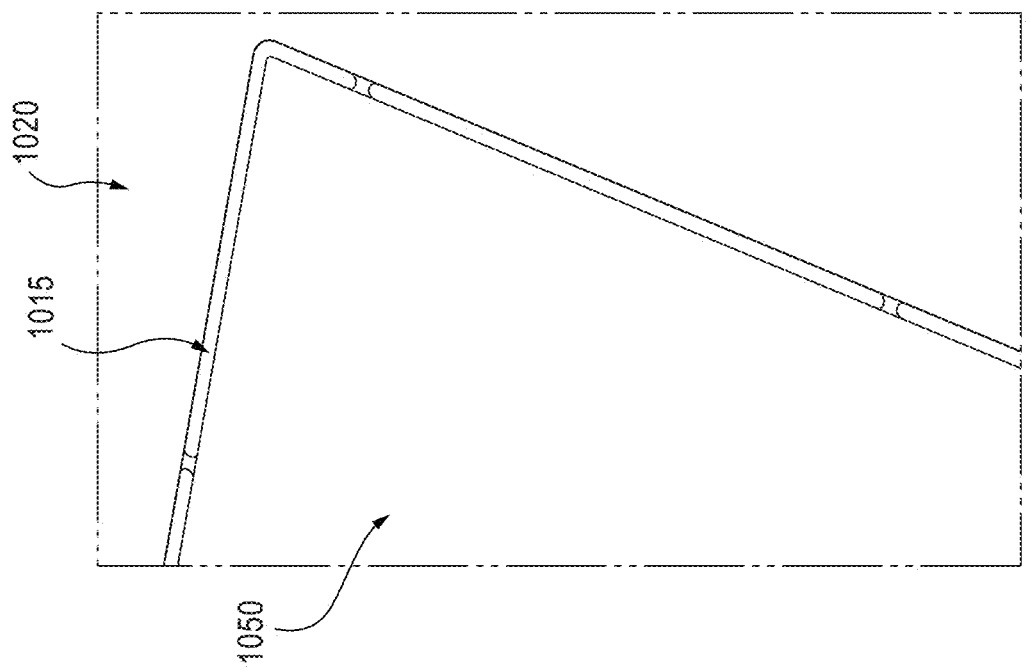
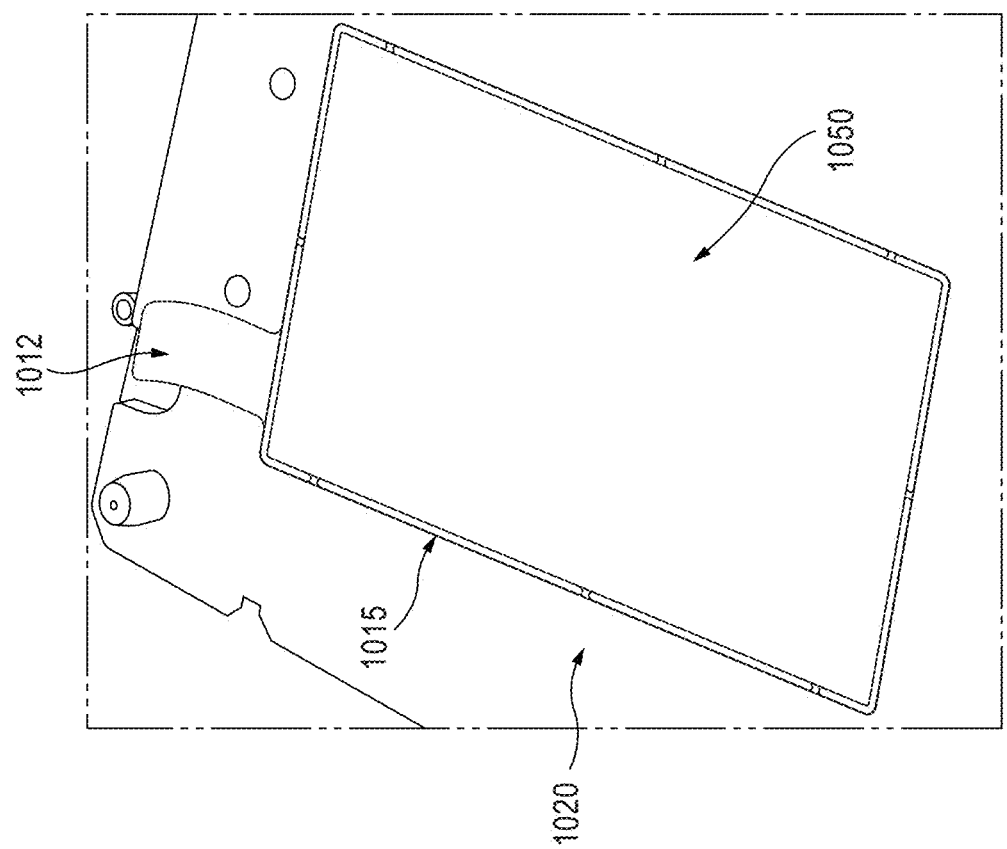

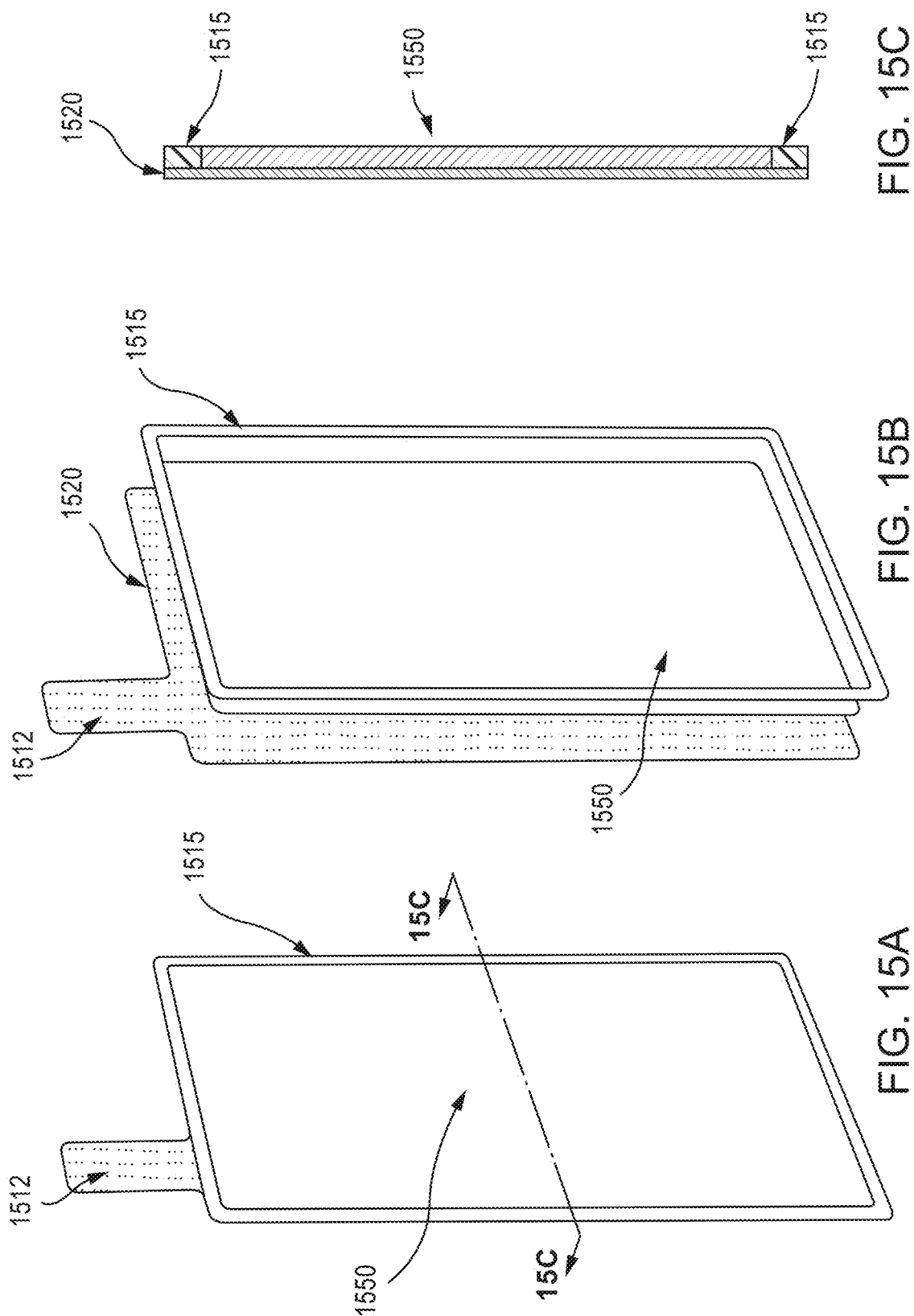

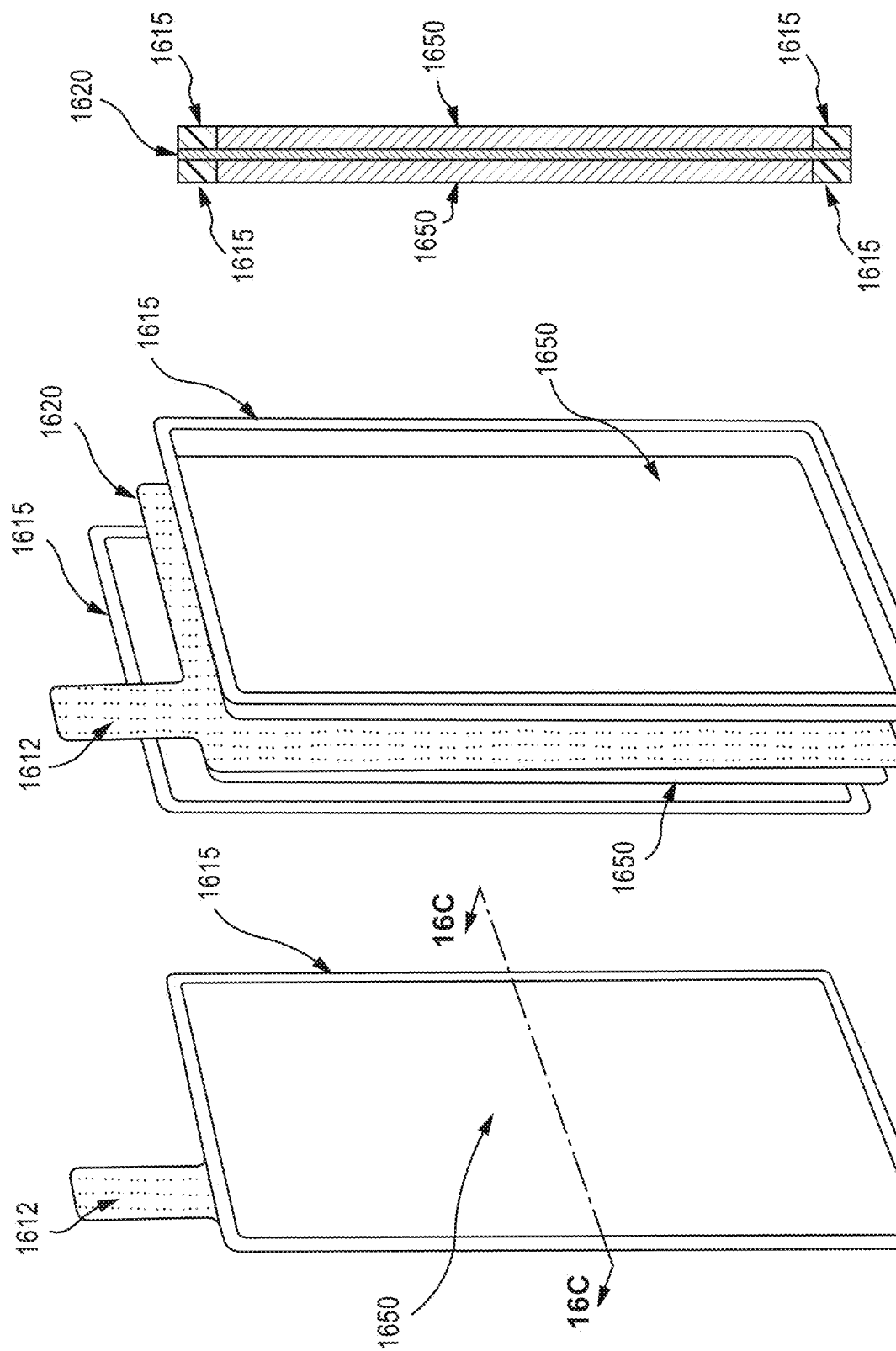

MECHANICAL SYSTEMS AND METHODS FOR PROVIDING EDGE SUPPORT AND PROTECTION IN SEMI-SOLID ELECTRODES

CROSS-REFERENCE TO RELATED APPLICATIONS

This application claims priority to and the benefit of U.S. Provisional Patent Application Ser. No. 62/163,658, filed May 19, 2015 and titled "Mechanical Systems and Methods for Providing Edge Support and Protection in Semi-Solid Electrodes," the disclosure of which is hereby incorporated by reference in its entirety.

BACKGROUND

Battery manufacturing methods can include coating a metallic substrate (e.g., a current collector) with a slurry that includes an active material, a conductive additive, and a binding agent dissolved or dispersed in a solvent, evaporating the solvent, and calendering the dried solid matrix to a specified thickness. However, packaging methods for conventional lithium-ion cells do not provide edge protection for electrodes once they are assembled (e.g., once packaged). It is generally desirable to improve the structural integrity of packaged batteries, in order to preserve their lifespan and performance.

SUMMARY

Embodiments described herein relate generally to electrodes for electrochemical cells that include an electrode material disposed on a current collector. In some embodiments, an electrode includes an edge protection barrier member on a perimeter of a surface of the current collector. The barrier member forms a wall along the main edge(s) of the current collector, defining an inner region bounded by the barrier member and the top surface of the current collector, and the electrode material occupies the inner region.

BRIEF DESCRIPTION OF THE DRAWINGS

FIGS. 10A and 10B are photographic partial views of a copper current collector, having a barrier member and an electrode material layer disposed thereon, according to an embodiment.

FIG. 15A is a schematic illustration of a perspective views of a single-sided wire mesh electrode assembly, according to an embodiment.

FIG. 15B is a schematic illustration of an exploded perspective view of the single-sided wire mesh electrode assembly of FIG. 15A.

FIG. 15C is a schematic illustration of a cross-section (taken along line 15C-15C) of the wire mesh electrode assembly of FIG. 15A.

FIG. 16A is a schematic illustration of a perspective views of a double-sided wire mesh electrode assembly, according to an embodiment.

FIG. 16B is a schematic illustration of an exploded perspective view of the double-sided wire mesh electrode assembly of FIG. 16A.

FIG. 16C is a schematic illustration of a cross-section (taken along line 16C-16C) of the wire mesh electrode assembly of FIG. 16A.

DETAILED DESCRIPTION

Figure 1:
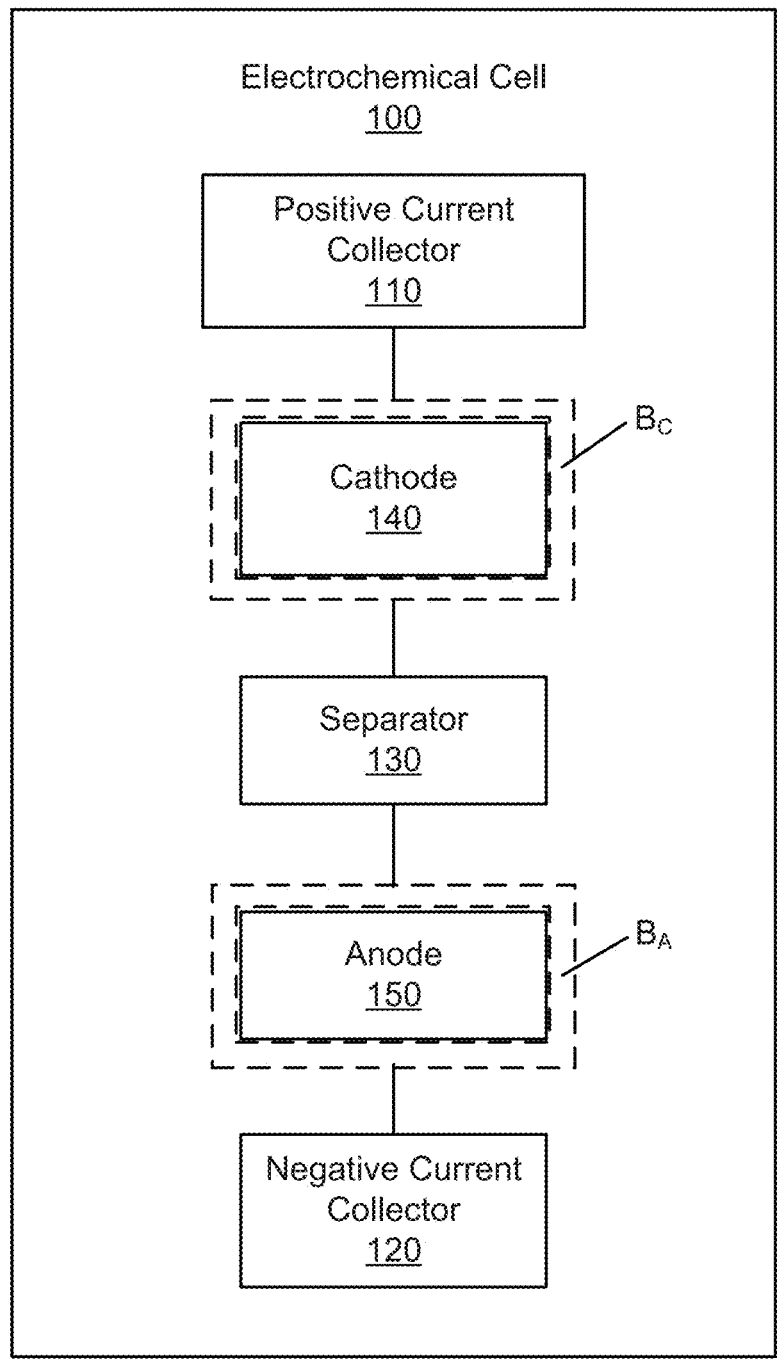
FIG. 1 is a schematic illustration of an electrochemical cell according to an embodiment.

Embodiments described herein relate generally to electrodes for electrochemical cells that include an electrode material disposed on a current collector. In some embodiments, an electrode includes an edge protection barrier member on a perimeter of a surface of the current collector. The barrier member forms a wall along the main edge(s) of the current collector, defining an inner region bounded by the barrier member and the top surface of the current collector, and the electrode material occupies the inner region.

Current packaging methods for conventional lithium-ion cells provide insufficient edge protection to electrodes inside their packaging, in some cases due to the very thin electrodes used in conventional lithium-ion cells. This can lead to problems such as bending or sagging of the foils and/or slurries of the cells at or near their edges, and consequently lead to performance degradation, mechanical and/or electrical instability, susceptibility to deformation or damage, and reduced lifespan. Due to these characteristics of conventional electrodes, a method and/or mechanism for preserving their mechanical integrity and/or shape is needed.

Other types of electrodes, such as semi-solid electrodes, also suffer from edge integrity issues. Consumer electronic batteries (or "electrochemical cells") have gradually increased in energy density with the progress of lithium-ion battery technology. The stored energy or charge capacity of a manufactured battery is a function of: (1) the inherent charge capacity of the active material (mAh/g), (2) the volume of the electrodes ($cm^3$) (i.e., the product of the electrode thickness, electrode area, and number of layers (stacks)), and (3) the loading of active material in the electrode media (e.g., grams of active material per $cm^3$ of electrode media). To enhance commercial appeal (e.g., to increase energy density and decrease cost), it is generally desirable to increase the areal charge capacity ($mAh/cm^2$). Semi-solid electrodes, which are substantially thicker than conventional electrodes (e.g., greater than 250 µm-up to 2,000 µm or even greater), can have a higher overall charge density, and when stacked to form batteries, exhibit a much higher ratio of active materials (i.e., the semi-solid cathode and/or anode) to inactive materials (i.e. the current collector and separator) as compared with batteries formed from electrochemical cell stacks that include conventional electrodes. This substantially increases the overall charge capacity and energy density of a battery that includes the semi-solid electrodes described herein. However, thick semi-solid electrode materials are also softer than conventional electrodes, can deform and/or migrate more easily, and may be prone to thinning or variations in thickness uniformity at the edges, etc. The thinning out of electrodes is undesirable, for example since it can cause a modification to the designed anode/cathode (A/C) ratio for a given electrode pair. Due to these characteristics of thick semi-solid electrodes, a method and/or mechanism for preserving their mechanical integrity and/or shape is needed.

Examples of electrochemical cells utilizing thick semi-solid electrodes and various formulations thereof are described in U.S. patent application Ser. No. 14/932,153 (also referred to as "the '153 application), filed Nov. 4, 2015, entitled "Electrochemical Cells Having Semi-Solid Electrodes and Methods of Manufacturing the Same," U.S. Pat. No. 8,993,159 (also referred to as "the '159 patent"), issued Mar. 31, 2015, entitled "Semi-Solid Electrodes Having High Rate Capability," U.S. Patent Application Publication No. 2014/0315097 (also referred to as "the '097 Publication), published Oct. 23, 2014, entitled "Asymmetric Battery Having a Semi-Solid Cathode and High Energy Density Anode," and U.S. Patent Application Publication No. 2015/0024279 (also referred to as "the '479 Publication") published Jan. 22, 2015, entitled "Semi-Solid Electrodes with Gel Polymer Additive," the entire disclosures of which are hereby incorporated by reference.

Embodiments of electrodes for electrochemical cells described herein can include a current collector having a planar surface, a barrier (also referred to herein as a "barrier member") disposed around a perimeter of the planar surface or disposed generally on the surface of the current collector to define an inner surface region of the current collector, and an electrode material disposed in the inner surface region of the current collector. The barrier can be inert or substantially inert or somewhat inert to reaction with an electrolyte (e.g., liquid or solid electrolyte) and can be formulated to provide an electrolyte-resistant edge protection and/or to serve as a mechanical barrier. The barrier can be formulated to withstand reaction with an electrolyte; in other words, the barrier can possess an electrolyte resistance or resistance to reaction with electrolyte, for at least a period of time, and the period of time can range from about 1 second to about 10 seconds, from about 10 seconds, to about 20 seconds, from about 20 seconds to about 30 seconds, from about 30 seconds to about 1 minute, from about 1 minute to about 2 minutes, from about 2 minutes to about 3 minutes, from about 3 minutes to about 5 minutes, from about 5 minutes to about 10 minutes, from about 10 minutes to about 20 minutes, from about 20 minutes to about 30 minutes, from about 30 minutes to about 45 minutes, from about 45 minutes to about 60 minutes, from about 60 minutes to about 90 minutes, from about 90 minutes to about 120 minutes, from about 120 minutes to about 180 minutes, from about 180 minutes to about 240 minutes, from about 240 minutes to about 300 minutes, from about 300 minutes to about 450 minutes, from about 450 minutes to about 600 minutes, from about 600 minutes to about 900 minutes, from about 900 minutes to about 1,200 minutes, from about 1,200 minutes to about 1,500 minutes, from about 1,500 minutes to about 1,800 minutes, from about 1,800 minutes to about 2,400 minutes, from about 2,400 minutes to about 3,000 minutes, from about 3,000 minutes to about 4,500 minutes, from about 4,500 minutes to about 6,000 minutes, from about 6,000 minutes to about 12,000 minutes, from about 12,000 minutes to about 24,000 minutes, from about 24,000 minutes to about 30,000 minutes, from about 30,000 minutes to about 45,000 minutes, from about 45,000 minutes to about 60,000 minutes, from about 60,000 minutes to about 90,000 minutes, from about 90,000 minutes to about 120,000 minutes, from about 120,000 minutes to about 180,000 minutes, from about 180,000 minutes to about 240,000 minutes, from about 240,000 minutes to about 300,000 minutes, from about 300,000 minutes to about 600,000 minutes, from about 600,000 minutes to about 900,000 minutes, from about 900,000 minutes to about 1,200,000 minutes, from about 1,200,000 minutes to about 1,800,000 minutes, from about 1,800,000 minutes to about 2,400,000 minutes, from about 2,40,000 minutes to about 3,000,000 minutes, and from about 3,000,000 minutes to about 6,000,000 minutes, inclusive of all ranges therebetween.

In some embodiments, the electrode material can be of any form, for example: conventional, semi-solid, solid, polymer gel, polymer, mesh, fabric, etc. The electrode can be fabricated via at least one of: direct infusion, press processing (e.g., rolling press, calendaring), dry powder processing, slurry application, screen printing, physical or chemical vapor deposition, evaporation, self-assembly, extrusion, conversion coating, sintering, molding, etc. The barrier member can have a nonzero width of about 3 mm or less, and a thickness of the barrier member is less than or equal to a thickness of the semi-solid electrode material. The barrier member is configured to protect electrodes from their packaging (e.g., from contact with containers such as pouches, canisters, boxes, cylinders, buttons, etc.) as well as from external forces that the electrode and/or the cell containing the electrode may encounter during usage or manufacturing processes (for example, forces caused by adjacent unit cells within a given electrochemical stack).

In some embodiments, in order to provide a mechanical method of maintaining edge protection for an electrode (such as a conventional electrode or a semi-solid electrode), a barrier member, comprising a barrier material, can be deposited around the perimeter of the current collector in a layer to create a "wall" of support for the electrode material on the current collector. The barrier material can be made of a UV-cured epoxy, a plastic, a resin, a ceramic, a film, an insulated metal, a mechanical frame, a liquid material (e.g., that is applied in liquid form and subsequently dried or cured), a solution, a gel material, a grease, an oil, or another type of material that is resistant to the components of electrolyte. Such electrodes, having one or more barrier members on their current collectors, can be stacked in a manner similar to that of conventional battery cells, and subsequently packaged (e.g., sealed inside of a pouch). The barrier member can range in thickness from about 0.5-2 µm to about 300-600 µm. The width of the barrier member can be less than 1 mm or as wide as 3 mm. In some embodiments, the thickness of the barrier member around the perimeter of the current collector is substantially the same as an average thickness of the electrode. In some embodiments, the thickness of the barrier member around the perimeter of the current collector is nonzero and is less than or equal to a thickness of the electrode. The barrier member can be applied to an anode current collector, a cathode current collector, or both. The barrier member can be configured to provide a number of functions: (1) act as a means of support (e.g., lateral support) for the edge(s) of the electrode, (2) ensure that a thickness of the electrode is maintained (e.g., during manufacturing, use, handling, etc.) and resistant to compressive forces (e.g., cannot be pressed and thinned out), (3) provide edge support for an anode and/or cathode "foil" (i.e., current collector) overhang, particularly with a soft electrode, (4) provide edge support for an anode and/or cathode "foil" (i.e., current collector) overhang during reduced pressure (e.g., vacuum) processing, and/or (5) prevent or limit migration of electrolyte from a front side/surface of the current collector (e.g., to an adjacent weld tab area and/or to a back side/surface of the current collector).

As used herein, the term "about" and "approximately" generally mean plus or minus 10% of the value stated, e.g., about 250 µm would include 225 µm to 275 µm, about 1,000 µm would include 900 µm to 1,100 µm.

As used herein, the term "semi-solid" refers to a material that is a mixture of liquid and solid phases, for example, such as particle suspension, colloidal suspension, emulsion, gel, or micelle.

FIG. 1 shows a schematic illustration of an electrochemical cell 100, according to an embodiment. The electrochemical cell 100 includes a positive current collector 110 and a negative current collector 120. A cathode 140 (e.g., a semi-solid cathode or a solid cathode) is disposed on the positive current collector 110, and can be surrounded by an electrolyte-resistant edge protection mechanical barrier member, "$B_C$," comprising a barrier material. Said another way, the barrier member $B_C$ can surround, enclose or substantially enclose the semi-solid cathode or solid cathode material. The barrier material of $B_C$ can comprise a UV-cured epoxy (e.g., as manufactured by Dymax (429, 724, 9422-SC, ACW AC A200-TX, AC 1450) or Henkel Loctite (3979, 3494)), a plastic, a mechanical frame, a liquid material, or another type of material that is resistant to the components of electrolyte. The barrier member can range in thickness from about 0.5-2 µm to about 300-600 µm. The width of the barrier member can be less than 1 mm or as wide as 3 mm. An anode 150 (e.g., a semi-solid anode or a solid anode) is disposed on the negative current collector 120, and can be surrounded by an electrolyte-resistant edge protection mechanical barrier member, "$B_A$," comprising a barrier material. Said another way, the barrier member $B_A$ can surround, enclose or substantially enclose the semi-solid anode or solid anode material. The barrier material of $B_A$ can comprise a UV-cured epoxy (e.g., as manufactured by Dymax (429, 724, 9422-SC, ACW AC A200-TX, AC 1450) or Henkel Loctite (3979, 3494)), a plastic, a mechanical frame, a liquid material, or another type of material that is resistant to the components of electrolyte. The barrier member can range in thickness from about 0.5-2 µm to about 300-600 µm. The width of the barrier member can be less than 1 mm or as wide as 3 mm. A separator 130 is disposed between the semi-solid cathode 140 and the semi-solid anode 150. At least one of the semi-solid cathode 140 and the semi-solid anode 150 has a thickness of at least about 250 µm, for example, in the range of about 250 µm to about 2,000 µm.

In some embodiments, the barrier member(s) (e.g., $B_C$ and/or $B_A$) are applied to a surface of a corresponding current collector prior to the disposing of a semi-solid cathode material or a semi-solid anode material. In some embodiments, the barrier member(s) (e.g., $B_C$ and/or $B_A$) are applied to a surface of a corresponding current collector substantially concurrently with the disposing of a semi-solid cathode material or a semi-solid anode material. In some embodiments, the barrier member(s) are applied to a surface of a corresponding current collector after disposing of a semi-solid cathode or a semi-solid anode material. Barrier members and/or barrier materials of the present disclosure can be applied onto a current collector using a variety of techniques, including (by way of non-limiting example): photolithographic patterning or other patterning of wet or dry films (e.g., via spray-coating, spin-coating, physical vapor deposition and/or chemical vapor deposition of a contiguous layer of barrier material and subsequently patterning it by applying an etch mask or by physical removal), screenprinting, transfer printing, offset printing, letterpress printing, stenciling, dispensing, masked deposition (e.g., via spray-coating, spin-coating, physical vapor deposition and/or chemical vapor deposition of a barrier material onto a pre-existing mask layer and subsequently removing the mask) nozzle or syringe dispensing, painting, lamination with or without adhesives, and/or the like. As a post process, pressure can be applied (with or without heat) to obtain a uniform thickness, a designed shape, reduced porosity, higher density, better adhesion, etc. Also, an inorganic filler, such as $SiO_2$, SiO, $Al_2O_3$, Zirconia, $AlO(OH)_2$, MgO, $Mg(OH)_2$, ceramic fiber, etc., can be added to the barrier material.

The positive current collector 110 and the negative current collector 120 can be any current collectors that are electronically conductive and are electrochemically inactive under the operating conditions of the cell. Typical current collectors for lithium cells include copper, aluminum, or titanium for the negative current collector 120 and aluminum for the positive current collector 110, in the form of sheets or mesh, expand metal or foamed metal, or any combination thereof. Current collector materials can be selected to be stable at the operating potentials of the semi-solid cathode 140 and the semi-solid anode 150 of the electrochemical cell 100. For example, in non-aqueous lithium systems, the positive current collector 110 can include aluminum, or aluminum coated with conductive material that does not electrochemically dissolve at operating potentials of 2.5-5.0V with respect to $Li/Li^+$. Such materials include platinum, gold, nickel, conductive metal oxides, such as vanadium oxide, and carbon. The negative current collector 120 can include copper or other metals that do not form alloys or intermetallic compounds with lithium, carbon, and/or coatings comprising such materials disposed on another conductor. Each of the positive current collector 110 and the negative current collector 120 can have a thickness of less than about 20 µm, for example, about 5 µm, 6 µm, 7 µm, 8 µm, 9 µm, 10 µm, 12 µm, 14 µm, 16 µm, or 18 µm, inclusive of all ranges therebetween. Use of such thin positive current collector 110 and negative current collector 120 can substantially reduce the cost and overall weight of the electrochemical cell 100.

The cathode 140 (e.g., a conventional cathode or a semi-solid cathode) and the anode 150 (e.g., a conventional anode or a semi-solid anode) included in the electrochemical cell 100 are separated by a separator 130. The separator 130 can be any conventional membrane that is capable of ion transport, i.e., an ion-permeable membrane. In some embodiments, the separator 130 is a liquid impermeable membrane that permits the transport of ions therethrough, namely a solid or gel ionic conductor. In some embodiments, the separator 130 is a porous polymer membrane infused with a liquid electrolyte that allows for the shuttling of ions between the semi-solid cathode 140 and the semi-solid anode 150 electroactive materials, while preventing the transfer of electrons. In some embodiments, the separator 130 is a microporous membrane that prevents particles forming the semi-solid cathode 140 and the semi-solid anode 150 compositions from crossing the membrane. In some embodiments, the separator 130 is a single or multi-layer microporous separator, optionally with the ability to fuse or "shut down" above a certain temperature so that it no longer transmits working ions, of the type used in the lithium ion battery industry and well-known to those skilled in the art. In some embodiments, the separator 130 can include a polyethyleneoxide (PEO) polymer in which a lithium salt is complexed to provide lithium conductivity, or Nafion™ membranes which are proton conductors. For example, PEO based electrolytes can be used as the separator 130, which is pinhole-free and a solid ionic conductor, optionally stabilized with other membranes such as glass fiber separators as supporting layers. PEO can also be used as a slurry stabilizer, dispersant, etc. in the positive or negative redox compositions. PEO is stable in contact with typical alkyl carbonate-based electrolytes. This can be especially useful in phosphate-based cell chemistries with cell potential at the positive electrode that is less than about 3.6 V with respect to Li metal. The operating temperature of the redox cell can be elevated as necessary to improve the ionic conductivity of the membrane.

The semi-solid cathode 140 can include an ion-storing solid phase material which can include, for example, an active material and/or a conductive material. The quantity of the ion-storing solid phase material can be in the range of about 0% to about 80% by volume. The cathode 140 can include an active material such as, for example, a lithium bearing compound (e.g., Lithium Iron Phosphate (LFP), $LiCoO_2$, $LiCoO_2$ doped with Mg, $LiNiO_2$, $Li(Ni, Co, Al)O_2$ (known as "NCA"), $Li(Ni, Mn, Co)O_2$ (known as "NMC"), $LiMn_2O_4$ and its derivatives, etc.). The cathode 140 can also include a conductive material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls," graphene sheets and/or aggregate of graphene sheets, any other conductive material, alloys or combination thereof. The cathode 140 can also include a non-aqueous liquid electrolyte such as, for example, ethylene carbonate, dimethyl carbonate, diethyl carbonate, or any other electrolyte described herein or combination thereof.

In some embodiments, the semi-solid anode 150 can also include an ion-storing solid phase material which can include, for example, an active material and/or a conductive material. The quantity of the ion-storing solid phase material can be in the range of about 0% to about 80% by volume. The semi-solid anode 150 can include an anode active material such as, for example, lithium metal, carbon, lithium-intercalated carbon, lithium titanate, lithium nitrides, lithium alloys and lithium alloy forming compounds of silicon, bismuth, boron, gallium, indium, zinc, tin, tin oxide, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, any other materials or alloys thereof, and any other combination thereof.

The semi-solid anode 150 can also include a conductive material which can be a carbonaceous material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls", graphene sheets and/or aggregate of graphene sheets, any other carbonaceous material or combination thereof. In some embodiments, the semi-solid anode 150 can also include a non-aqueous liquid electrolyte such as, for example, ethylene carbonate, dimethyl carbonate, diethyl carbonate, or any other electrolyte described herein or combination thereof. In some embodiments, the semi-solid cathode 140 and/or the semi-solid anode 150 can include active materials and optionally conductive materials in particulate form suspended in a non-aqueous liquid electrolyte.

In some embodiments, both electrodes of the electrochemical cell 100 are semi-solid electrodes (i.e., a semi-solid cathode 140 and a semi-solid anode 150). In other embodiments, the electrochemical cell 100 includes only one semi-solid electrode. For example, in some embodiments, the cathode 140 can be a semi-solid cathode and the anode 150 can be a conventional solid anode (e.g., a high capacity solid anode). Similarly, in some embodiments, the cathode 140 can be a solid cathode and the anode 150 can be semi-solid anode.

In some embodiments, the cathode 140 and/or anode 150 comprise semi-solid suspensions that are initially flowable, and can be caused to become non-flowable by "fixing". In some embodiments, fixing can be performed by the action of photopolymerization. In some embodiments, fixing is performed by action of electromagnetic radiation with wavelengths that are transmitted by the unfilled positive and/or negative electroactive zones of the electrochemical cell 100 formed from a semi-solid cathode and/or semi-solid anode. In some embodiments, the semi-solid suspension can be fixed by heating. In some embodiments, one or more additives are added to the semi-solid suspensions to facilitate fixing. In some embodiments, an injectable and flowable semi-solid cathode 140 and/or semi-solid anode 150 is caused to become non-flowable by "plasticizing". In some embodiments, the rheological properties of the injectable and flowable semi-solid suspension are modified by the addition of a thinner, a thickener, and/or a plasticizing agent, for example to promote processability and help retain compositional uniformity of the semi-solid suspension under flowing conditions and positive and negative electroactive zone filling operations. One or more additives can be added to the flowable semi-solid suspension to adjust its flow properties to accommodate processing requirements.

Systems employing negative and/or positive ion-storage materials that are storage hosts for working ions, meaning that said materials can take up or release the working ion while all other constituents of the materials remain substantially insoluble in the electrolyte, are particularly advantageous as the electrolyte does not become contaminated with electrochemical composition products. In addition, systems employing negative and/or positive lithium ion-storage materials are particularly advantageous when using non-aqueous electrochemical compositions.

In some embodiments, the semi-solid ion-storing redox compositions include materials proven to work in conventional lithium-ion batteries. In some embodiments, the positive semi-solid electroactive material contains lithium positive electroactive materials and the lithium cations are shuttled between the negative electrode and positive electrode, intercalating into solid, host particles suspended in a liquid electrolyte.

Semi-solid electrodes described herein can be casted, drop coated, pressed, roll pressed, or otherwise disposed on the current collectors using any other suitable method. Coating the semi-solid electrodes on only one side of the current collectors can substantially reduce the time period for forming the electrochemical cell 100. This can substantially reduce evaporation of the electrolyte included in the semi-solid cathode 140 and/or the semi-solid anode 150 slurry formulations. Furthermore, exposure of the electrolyte to the moisture present in the ambient environment can be minimized, thereby preventing degradation of the electrolyte.

A plurality of electrochemical cells can be disposed in a cell stack to form an electrochemical cell stack. For example, the electrochemical cell 100 can be a first electrochemical cell 100. The cell stack can include a second electrochemical cell (not shown) and a third electrochemical cell (not shown). Each of the second electrochemical cell and the third electrochemical cell can be substantially similar to the first electrochemical cell 100. An uncoated surface of a positive current collector included in the second electrochemical cell can be disposed on an uncoated surface of the positive current collector 110 included in first electrochemical cell 100. Similarly, an uncoated surface of a negative current collector included in the third electrochemical cell can be disposed on an uncoated surface of the negative current collector 120 included in first electrochemical cell 100. Any number of electrochemical cells 100 can be included in the cell stack. Stacking the plurality of the electrochemical cells 100 as described herein significantly reduces the time required to form the electrochemical cell stack. This can minimize evaporation and/or degradation of the electrolyte as described herein.

Figure 2:
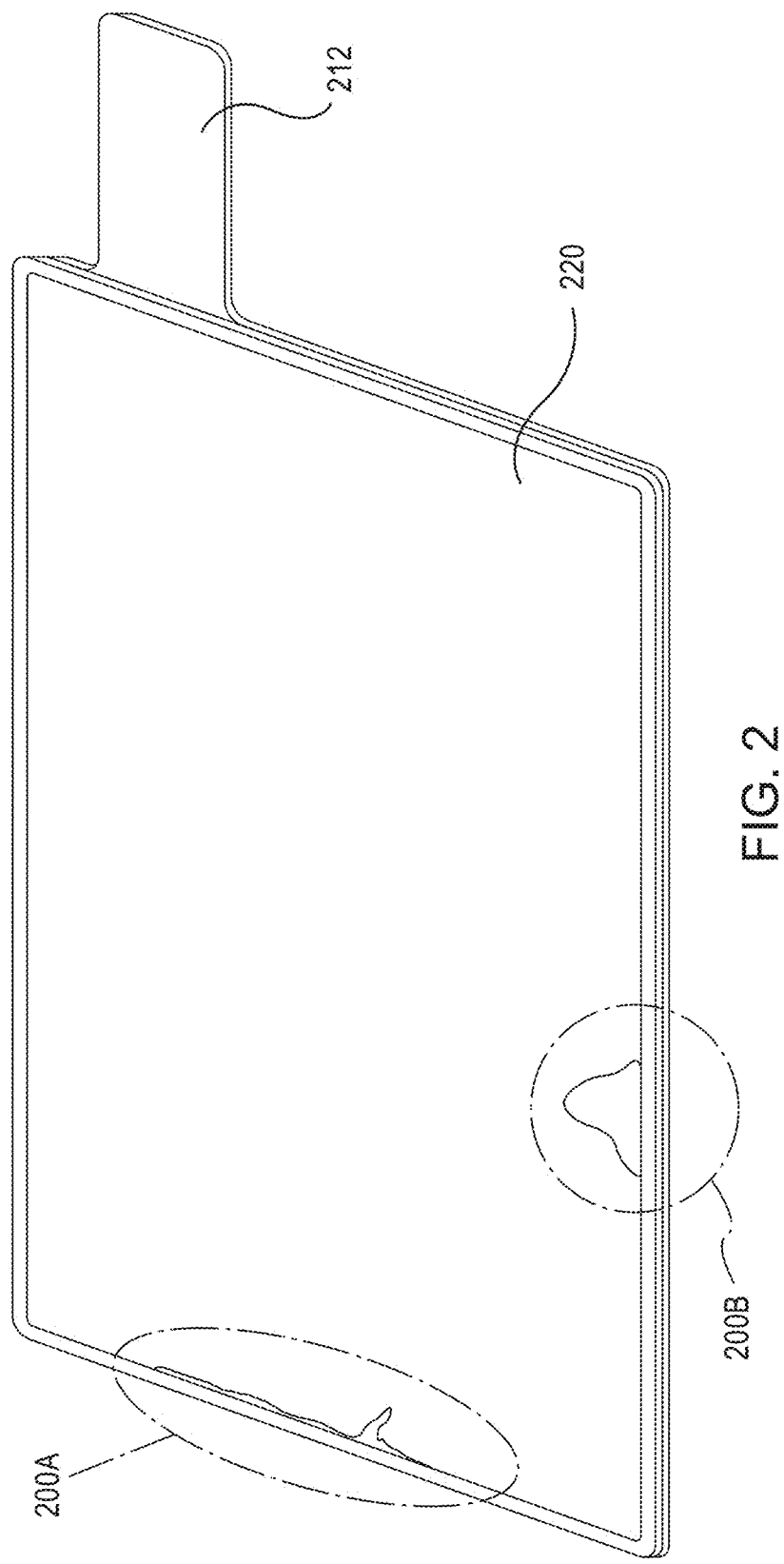
FIG. 2 is a photograph of a current collector showing the migration of electrolyte.

FIG. 2 shows a substantially bare back side of a copper current collector 220, the front having a semi-solid material disposed thereon without the use of a barrier member. The migration of electrolyte from the front side (not visible) of the current collector to the back side of the current collector 220 is visible at 200A and 200B. The current collector 220 can be a positive current collector or a negative collector, and can be formed from a metal foil, for example, a copper or aluminum foil, or any other materials described herein with respect to current collectors included in the electrochemical cell 100. The current collector 220 can have a thickness in the range of about 20 µm to about 40 µm, for example, about 25 µm, about 30 µm, or about 35 µm, inclusive of all ranges therebetween. In some embodiments, the current collector 220 can have a thickness of less than about 20 µm, for example, about 5 µm, 6 µm, 7 µm, 8 µm, 9 µm, 10 µm, 12 µm, 14 µm, 16 µm, or about 18 µm, inclusive of all ranges therebetween. The current collector 220 includes a weld tab 212 configured to be coupled with an electrical lead. In some embodiments, the weld tab 212 can be cut to a desired length for coupling with a lead. The lead can be a strip of a conducting metal (e.g., copper or aluminum) which can be coupled to the weld tab 212 using any suitable method, for example, ultrasonic welding, clamping, crimping, adhesive tape, and/or the like.

Figure 3:
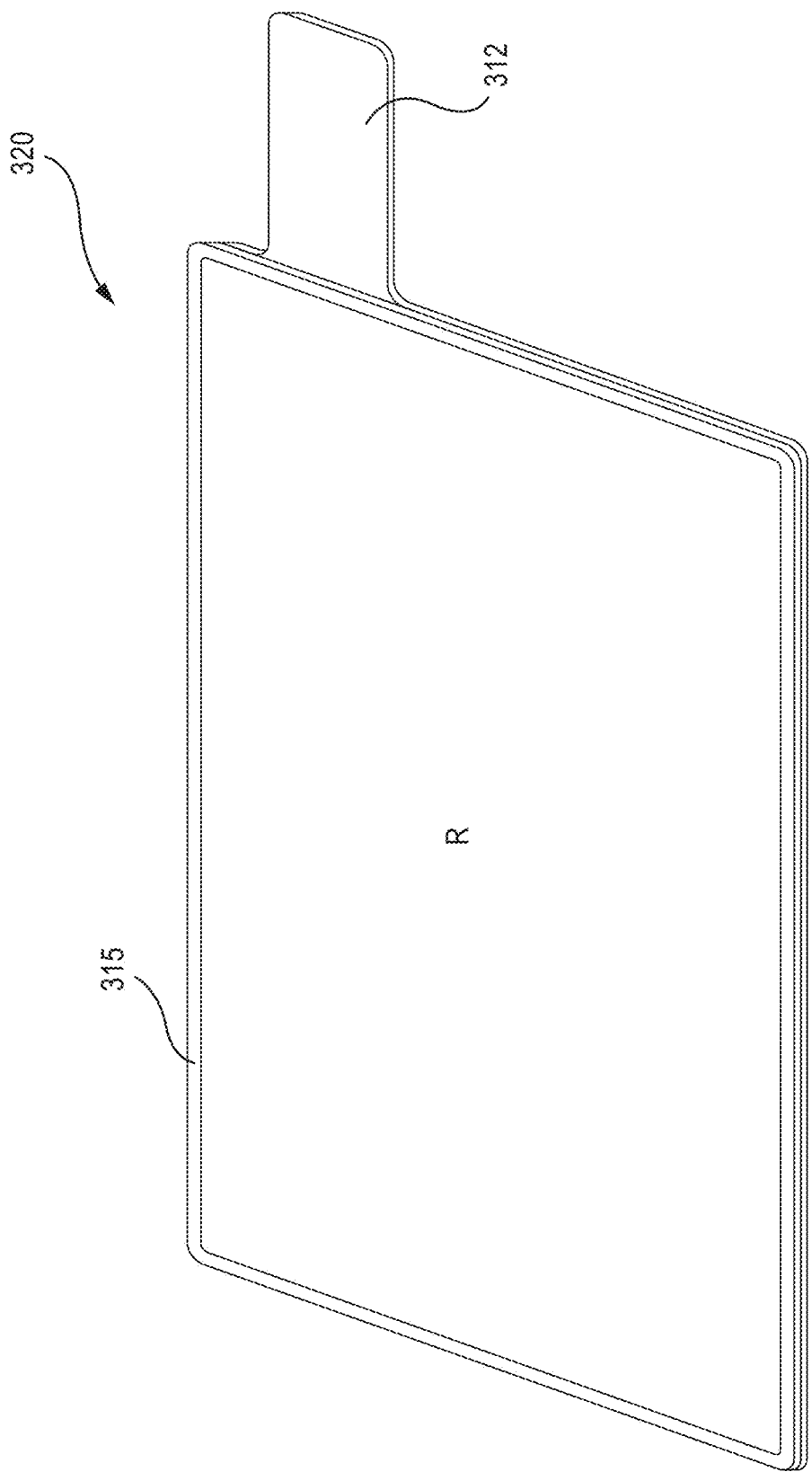
FIG. 3 is a schematic illustration of a perspective view of a current collector having a barrier member, according to an embodiment.
Figure 4:
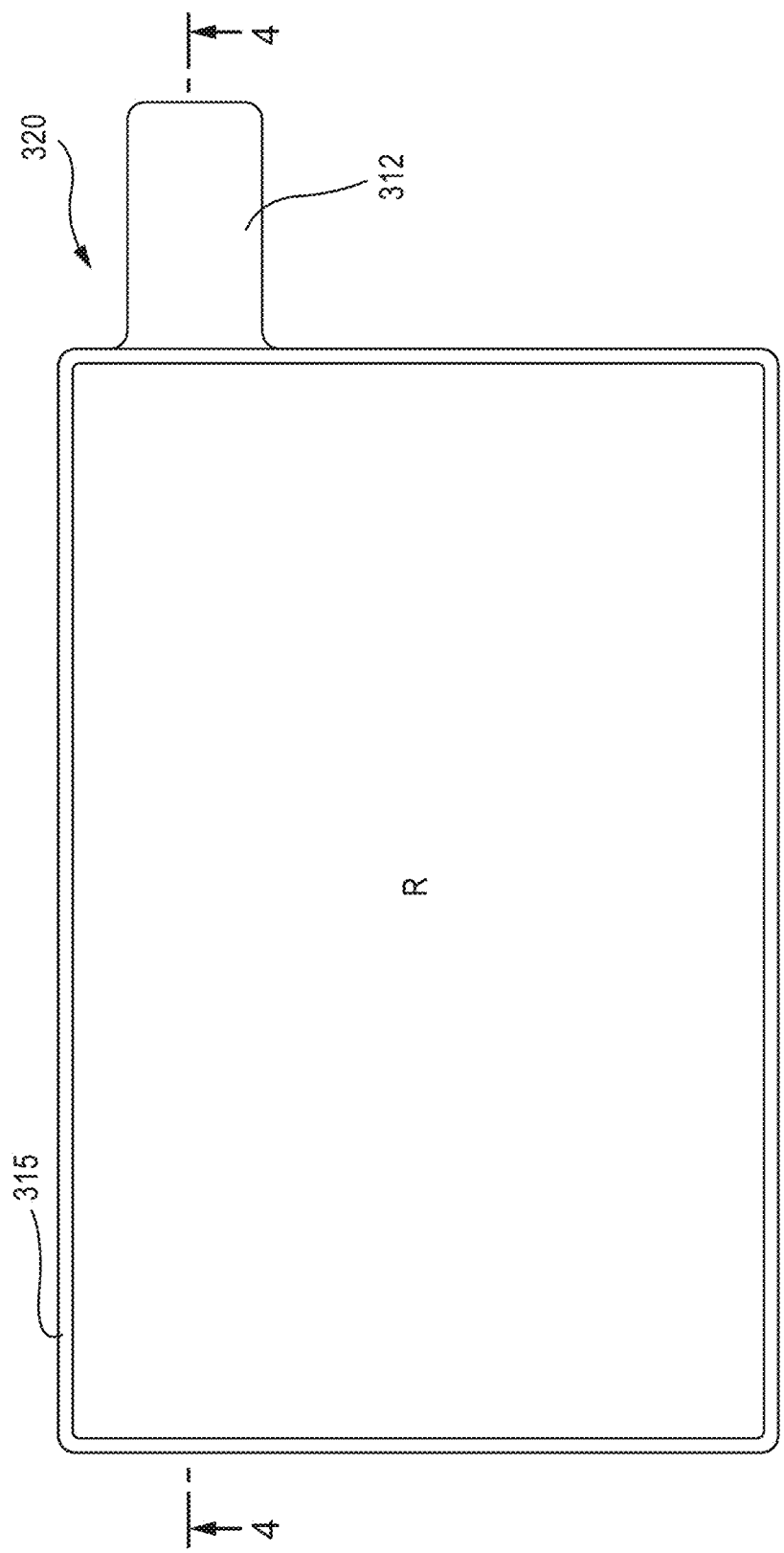
FIG. 4 is a top view of the current collector of FIG. 3.

FIG. 3 is a schematic illustration of a perspective view of a current collector 320, having a weld tab 312 and a barrier member 315, according to an embodiment. As shown, the barrier member 315 is disposed along the perimeter of the current collector 320 (i.e., along all four sides of the substantially rectangular current collector 320, although other shapes are contemplated by this disclosure, including circular, square, polygonal, oval, etc.). The barrier member 315 forms a wall along the main edges of the current collector 320, and defines an inner region "R" bounded by the barrier member 315 and the top surface of the current collector 320. FIG. 4 is a top view of the current collector of FIG. 3.

Figure 5:
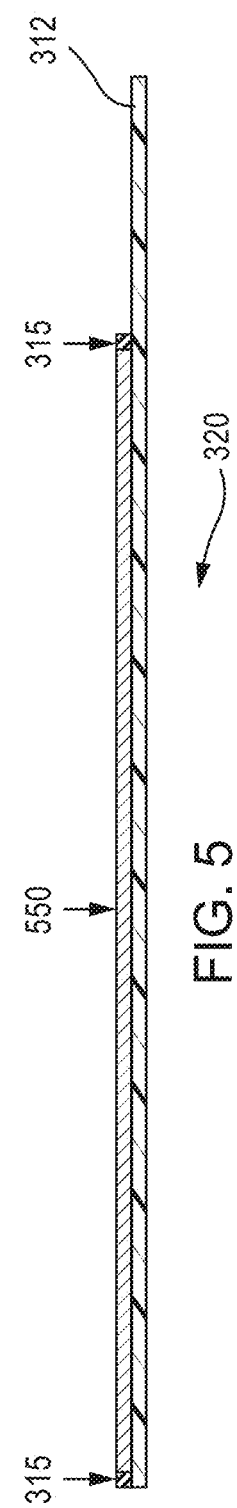
FIG. 5 is a cross-sectional view of the current collector of FIG. 3, taken along line "4" in FIG. 4.
Figure 6B:
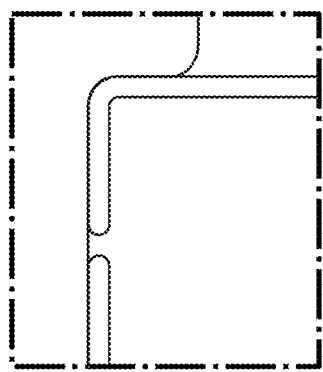
FIGS. 6A-6C are photographic partial views of a copper current collector having a barrier member, according to an embodiment.
Figure 6C:
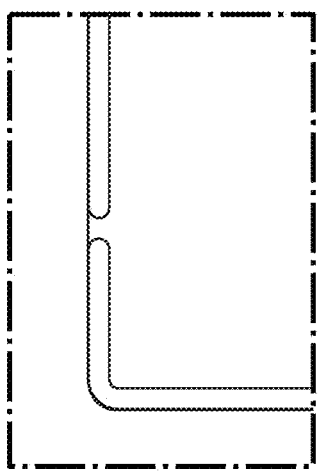
Figure 6A:
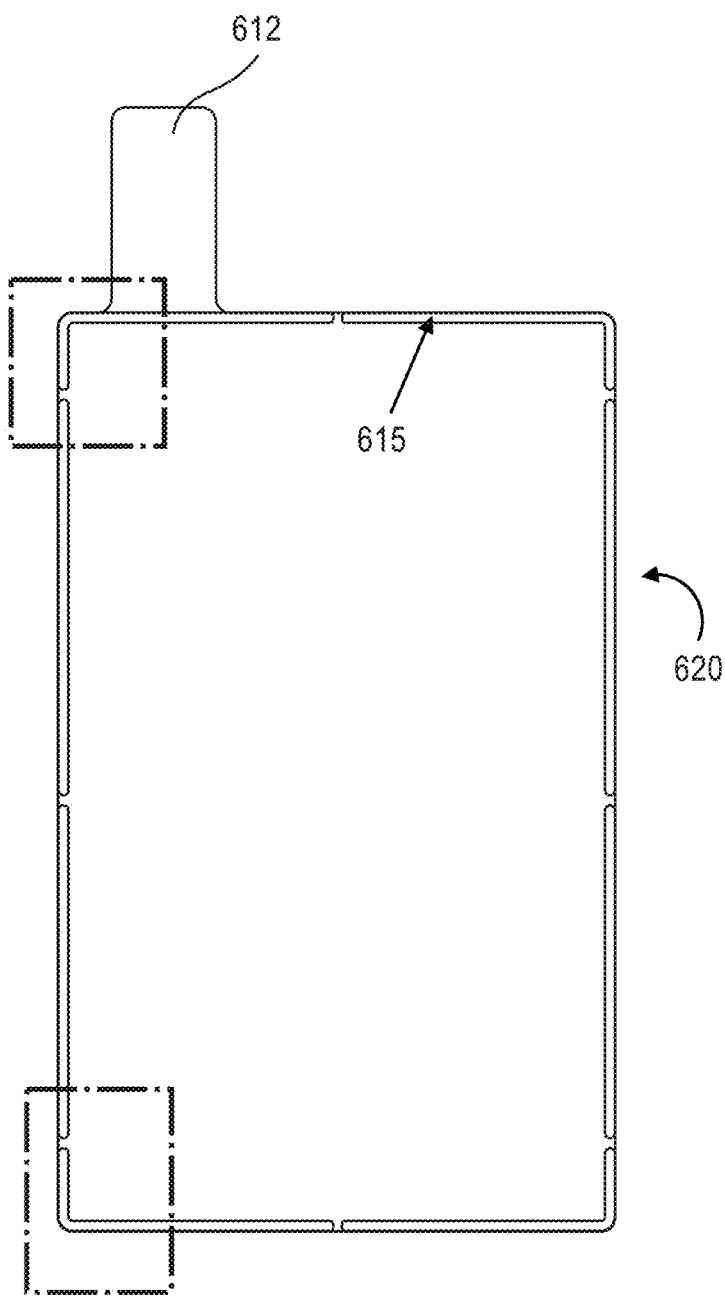
Figure 7A:
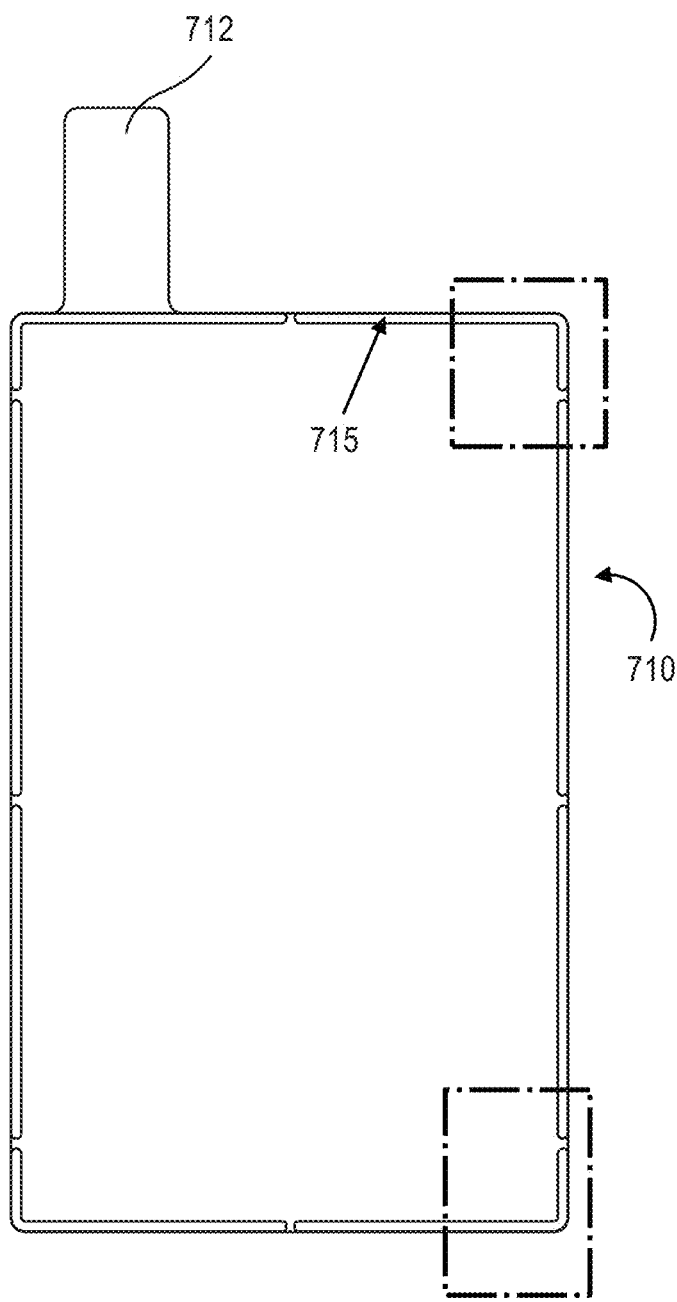
FIGS. 7A-7C are photographic partial views of an aluminum current collector having a barrier member, according to an embodiment.
Figure 7B:
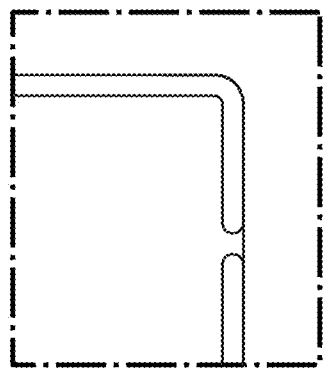
Figure 7C:
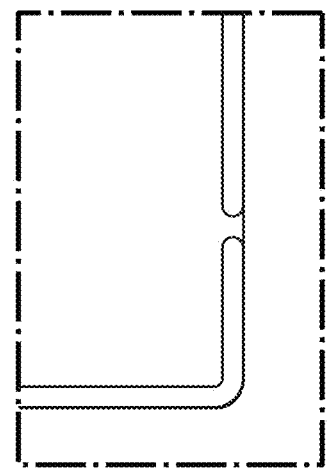

FIG. 5 is a cross-sectional view of the current collector of FIG. 3, taken along line "4" in FIG. 4, and including an electrode material 550 disposed within the region "R." As shown in FIG. 5, a thickness of the electrode material 550 is substantially the same as the thickness of the barrier member 315. In some embodiments, the thickness of the electrode material 550 and/or the thickness of the barrier member 315 are/is an average thickness, for example taken across a sample region of the current collector 320. FIGS. 6A-6C are photographic partial views of a copper current collector 620 having a weld tab 612 and a barrier member 615, according to an embodiment. FIGS. 7A-7C are photographic partial views of an aluminum current collector 710 having a weld tab 712 and a barrier member 715, according to an embodiment.

Figure 8:
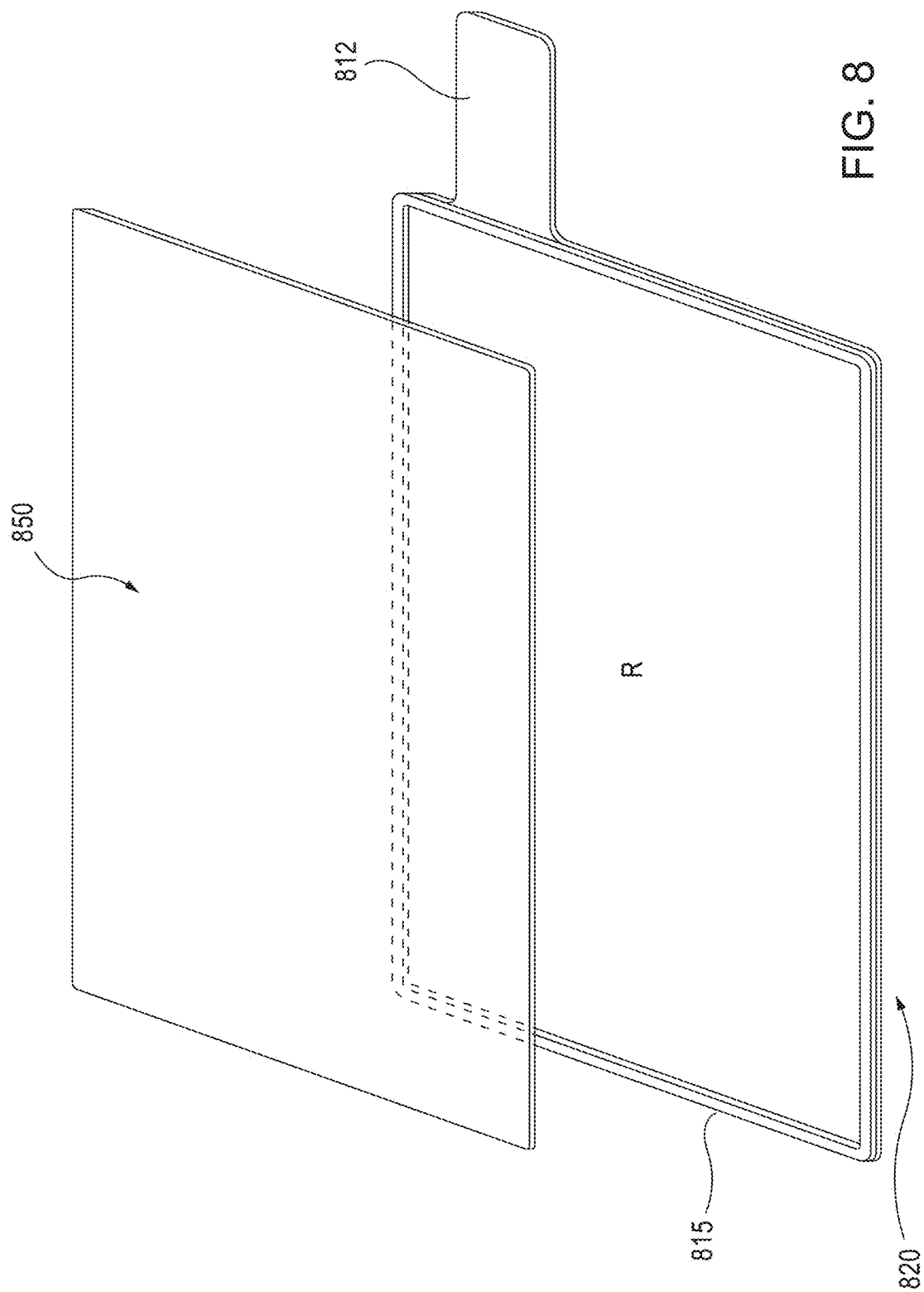
FIG. 8 is a schematic illustration of a partially exploded perspective view of a current collector having a barrier member, and an electrode material layer, according to an embodiment.

FIG. 8 is a schematic exploded view of an electrode of the instant disclosure, comprising a current collector 820 having a weld tab 812 and a barrier member 815, and an electrode material layer 850 (which can be of a solid or semi-solid composition), according to an embodiment.

Figure 9A:
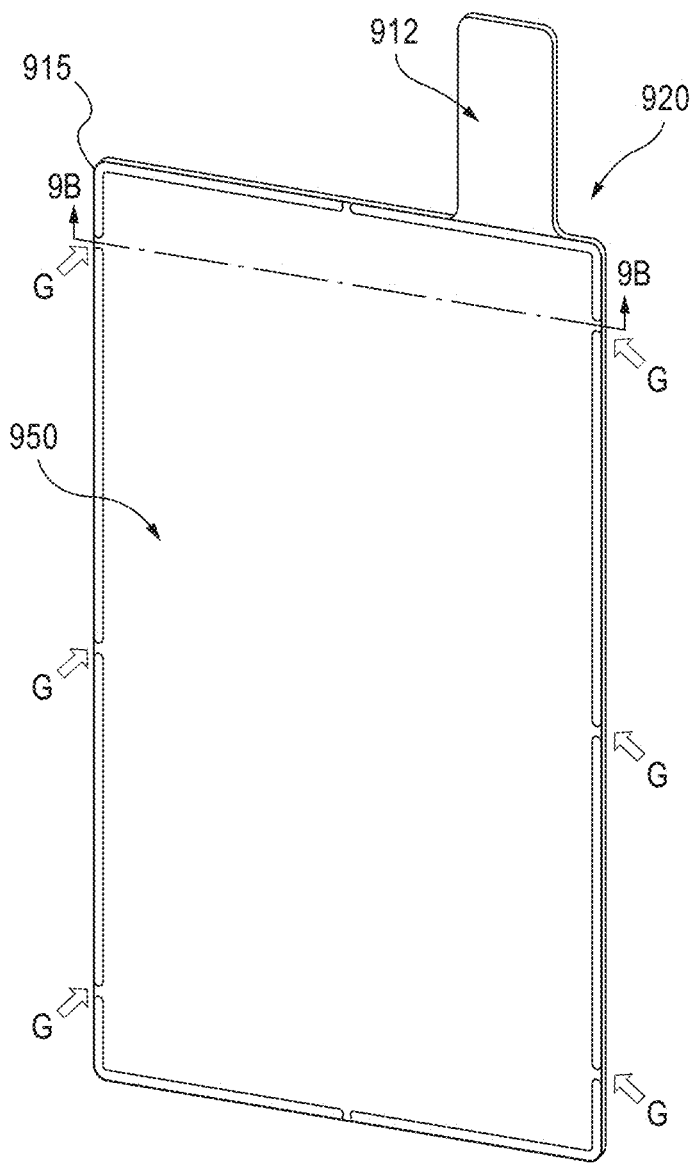
FIG. 9A is a schematic illustration of a current collector with a barrier member and an electrode material layer disposed thereon, according to an embodiment.
Figure 9B:
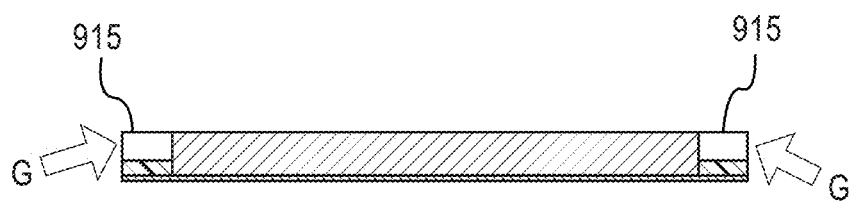
FIG. 9B is a cross-sectional view of the current collector of FIG. 9A, taken along line 9B-9B in FIG. 9A.

FIG. 9A is a schematic illustration of a current collector 920 with a weld tab 912 and a barrier member 915 and an electrode material layer 950 (which can be of a solid or semi-solid composition) disposed thereon, according to an embodiment. As shown in FIG. 9A, the barrier member 915 forms a "wall" that is not continuous, but rather includes a plurality of gaps (indicated by arrows "G"). In such embodiments, the barrier member 915 may be said to be "porous," in that the gaps function as "pores." These gaps are areas of the wall that can be regions of the barrier member 915 that have a different height or thickness than those of neighboring regions of the barrier member 915. Such gaps can, for example, allow gas to escape during a degassing process. These gaps may be imparted in many ways, including masking of the surface before or during application of the barrier material, stenciling (e.g., by virtue of mechanical attachment points in the stencil, some regions are either not coated or coated to a lesser extent during application of the barrier material), patterning and etching the barrier member 915 after it has been applied, mechanical removal of portions of the barrier member 915 after it has been applied, etc. FIG. 9B is a cross-sectional view of the current collector of FIG. 9A, taken along line 9B-9B in FIG. 9A. As shown in FIG. 9B, the height or thickness of the gap regions (indicated by arrows "G") is lower than the thickness of neighboring regions of the barrier member 915.

In other embodiments, the gaps described above are completely free from barrier material (i.e., open rather than partially obscured by a lower thickness of barrier material). In still other embodiments, the barrier member 915 is continuous (i.e., does not define any gaps) or only defines one gap.

FIGS. 10A and 10B are photographic partial views of an electrode of the instant disclosure, comprising a copper current collector 1020 (including a weld tab 1012) having a barrier member 1015, and an electrode material layer 1050. The electrode layer 1050 is disposed substantially within an inner region bounded by the barrier member 1015 and a top planar surface of the current collector 1020.

Figure 11A:
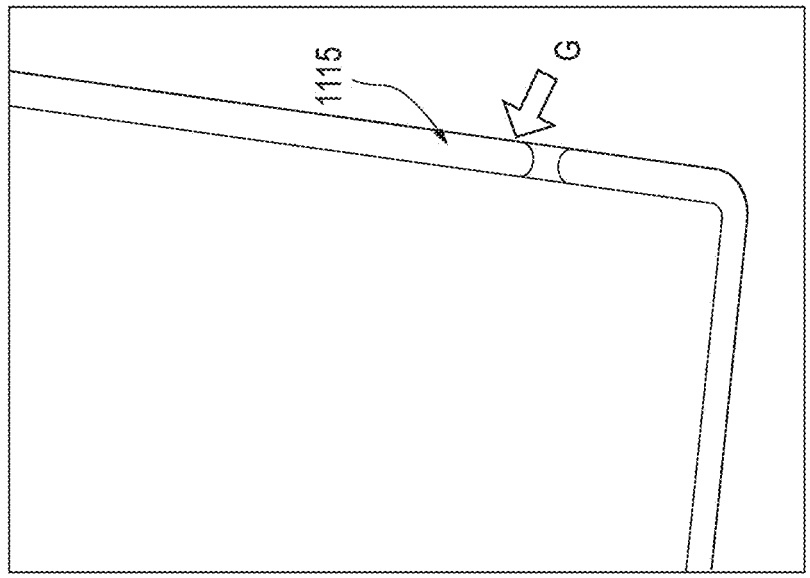
FIGS. 11A and 11B are photographic partial views of an aluminum current collector, having a barrier member and an electrode material layer disposed thereon, according to an embodiment.
Figure 11B:
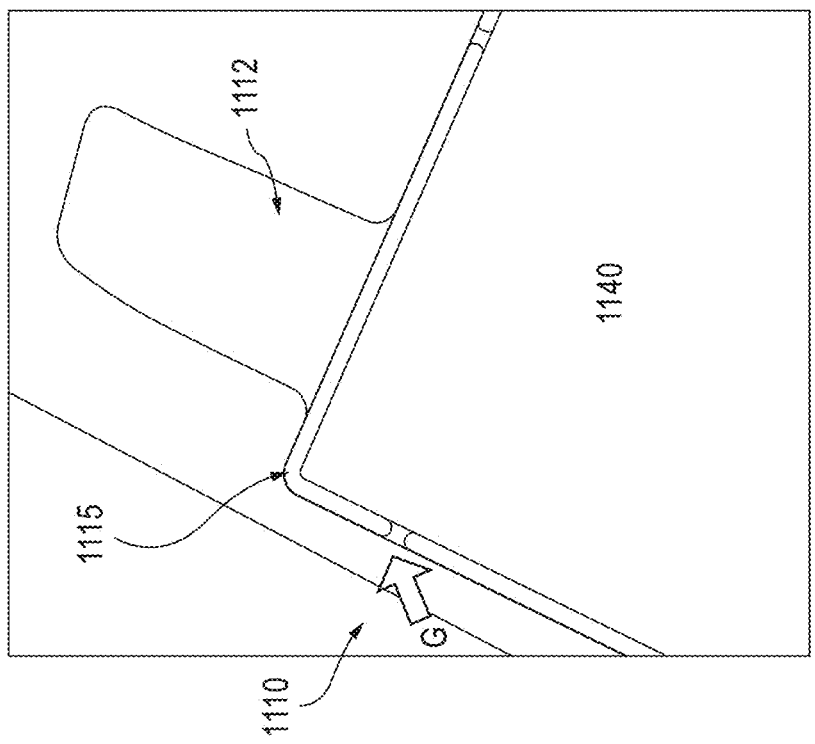

FIGS. 11A and 11B are photographic partial views of an electrode of the instant disclosure, comprising an aluminum current collector 1110 (including a weld tab 1112) having a barrier member 1115 (the barrier member 1115 defining/including gaps "G," as discussed above with reference to FIGS. 9A and 9B), and an electrode material layer 1140. The electrode layer 1140 is disposed substantially within an inner region bounded by the barrier member 1115 and a top planar surface of the current collector 1110.

Figure 12:
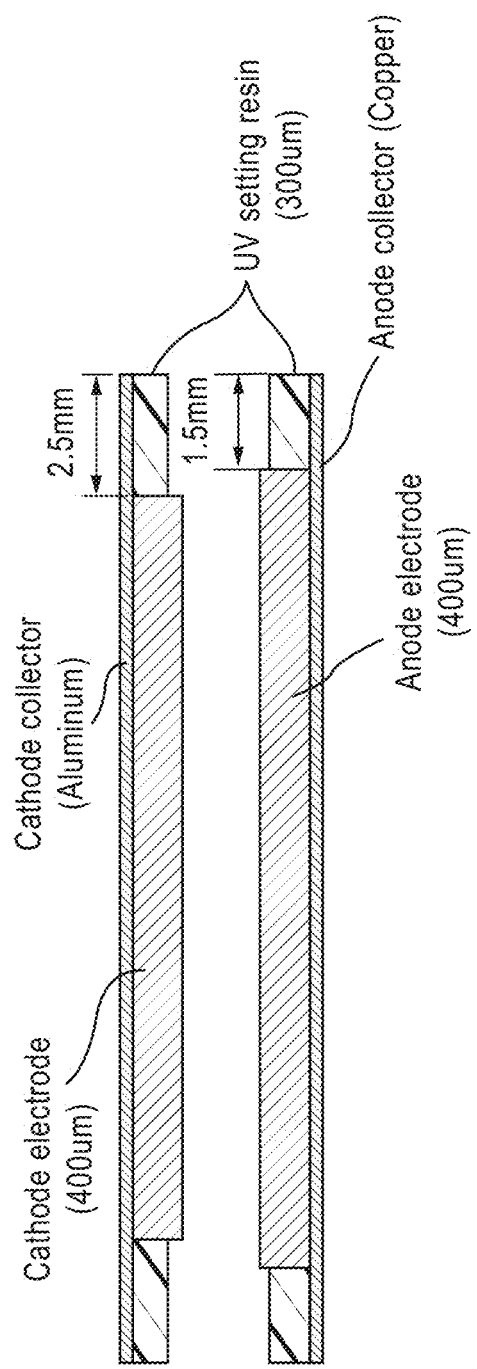
FIG. 12 is a schematic illustration of cross-sectional views of a cathode and an anode, each including a barrier member, according to an embodiment.

FIG. 12 is a schematic illustration of cross-sectional views of a cathode and an anode, each including a barrier member comprising a UV setting resin, according to an embodiment and showing exemplary dimensions.

Figure 13:
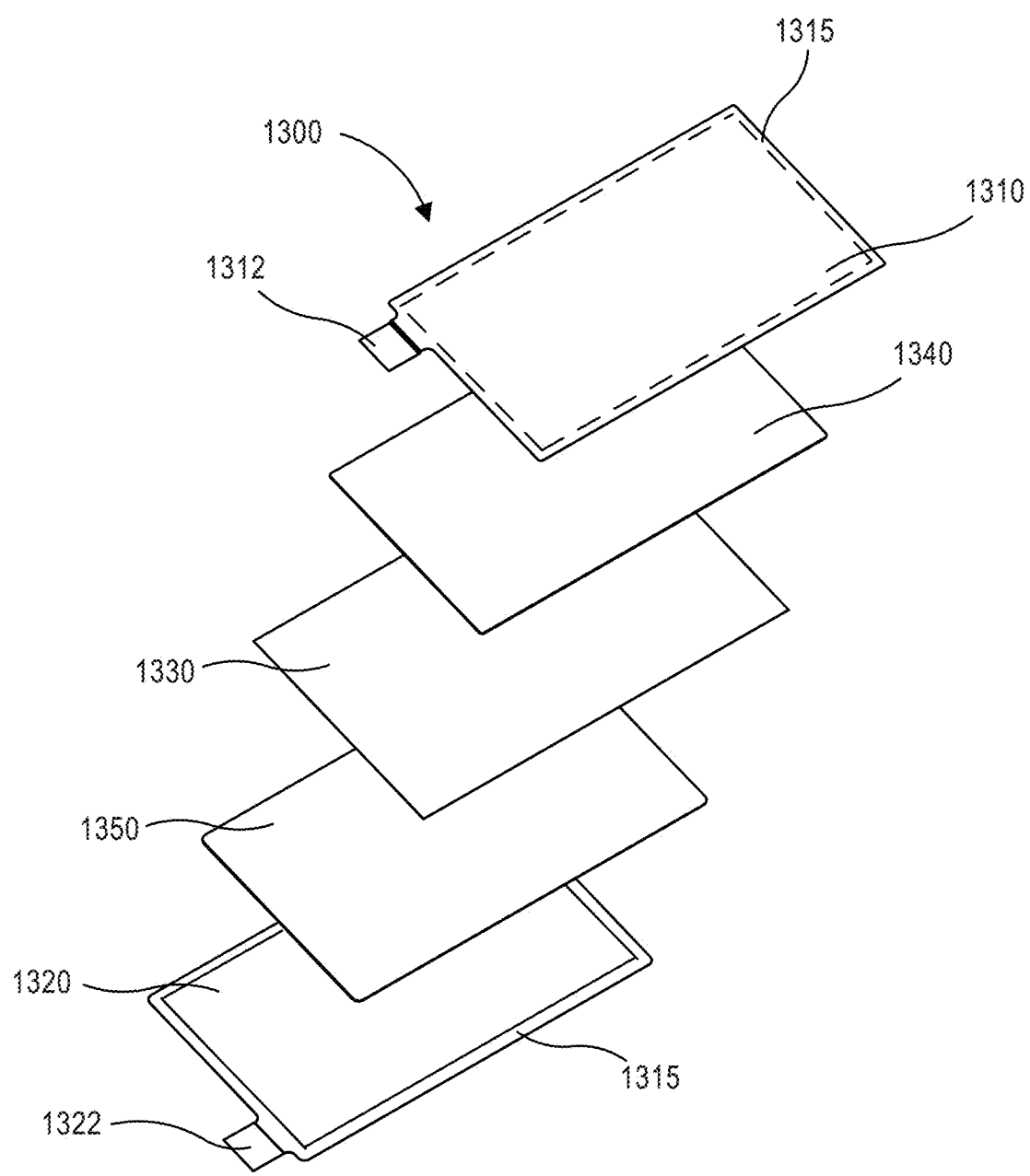
FIG. 13 is an exploded view of an electrochemical cell, according to an embodiment.

FIG. 13 is an exploded view of an electrochemical cell 1300 according to some embodiments. A semi-solid cathode 1340 is disposed, for example coated, on a first surface of the positive current collector 1310 which is proximal to the separator 1330. The first surface of the positive current collector 1310 includes a barrier member 1315 on a perimeter surface portion thereof. A second surface of the positive current collector 1310 distal to the separator 1330 is left uncoated. Similarly the semi-solid anode 1350 is disposed, for example coated, on a first surface of the negative current collector 1320 which is proximal to the separator 1330. A second surface of the negative current collector 1320 distal to the separator 1330 is left uncoated. Said another way, the semi-solid cathode 1340 and the semi-solid anode 1350 are coated on only one side of the positive current collector 1310 and the negative current collector 1320, respectively. Coating only one side reduces the time required to prepare the electrochemical cell 1300. This can reduce the evaporation and/or degradation (e.g., due to ambient humidity) of an electrolyte included in the semi-solid cathode 1340 and/or the semi-solid anode 1350 formulations. The semi-solid cathode 1340 and the semi-solid anode 1350 can be formulated using any components (e.g., active materials and/or conductive materials, electrolytes, additives, gel polymers, etc.) as described with respect to cathode 140 and the anode 150 included in the electrochemical cell 100, respectively. Moreover, each of the semi-solid cathode 1340 and/or the semi-solid anode 1350 can have a thickness of at least about 250 µm. For example, the semi-solid cathode 1340 and/or the semi-solid anode 1350 can have a thickness in the range of about 250 µm to about 2,000 µm. A plurality of electrochemical cells 1300 (i.e., "unit cells"), or any other electrochemical cells described herein, can be disposed in an electrochemical cell stack, for example, to form an electrochemical battery.

Figure 14A:
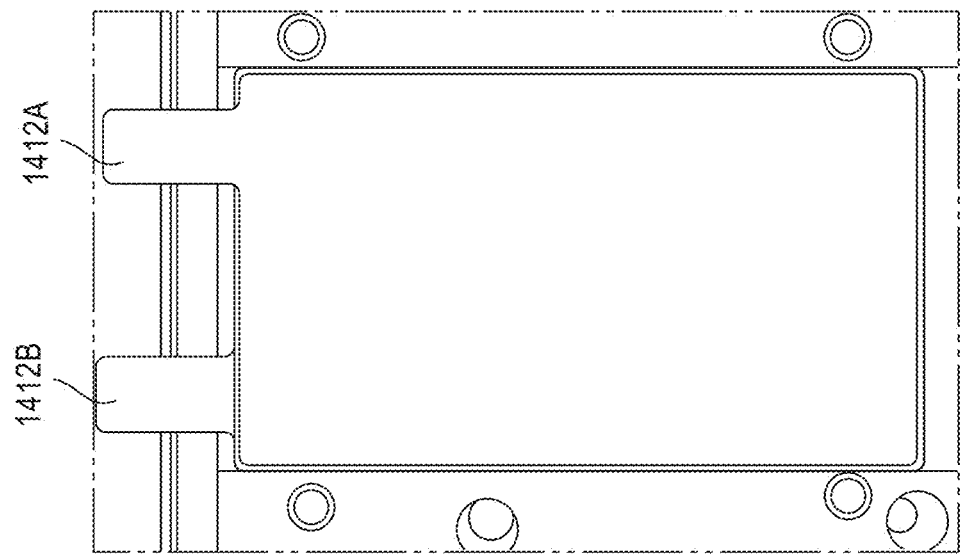
FIGS. 14A and 14B are opposing photographic plan views of an assembled electrochemical cell stack, according to an embodiment.
Figure 14B:
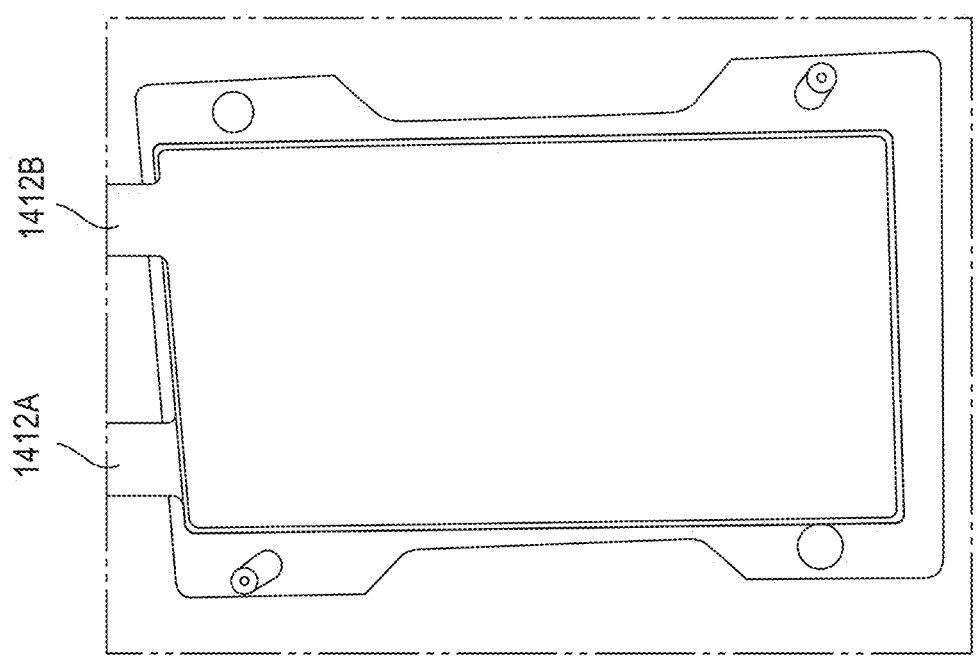

FIGS. 14A and 14B are opposing photographic plan views of an assembled electrochemical cell stack, including at least one barrier member as described herein, according to an embodiment. As can be seen in FIGS. 14A and 14B, no electrolyte has migrated, wicked or leaked onto the outwardly-facing surfaces of the electrodes.

FIG. 15A is a schematic illustration of a perspective views of a single-sided wire mesh electrode assembly, according to an embodiment, and FIG. 15B is a schematic illustration of an exploded perspective view thereof. As shown in FIG. 15B, a substantially planar layer of electrode slurry 1550 is disposed on a first planar side of a wire mesh current collector 1520 (having a weld tab 1512 extending therefrom). A barrier member 1515 is also disposed on the first planar side of the wire mesh current collector 1520, occupying a perimeter surface region thereof, and surrounding the electrode slurry 1550. FIG. 15C is a schematic illustration of a cross-section (taken along line 15C-15C) of the single-sided wire mesh electrode assembly of FIG. 15A.

FIG. 16A is a schematic illustration of a perspective view of a double-sided wire mesh electrode assembly, according to an embodiment, and FIG. 16B is a schematic illustration of an exploded perspective view thereof. As shown in FIG. 16B, a wire mesh current collector 1620, having a weld tab 1612 extending therefrom, is disposed between two substantially planar layers of electrode slurry 1650. Two barrier members 1615 are disposed, each on an opposing substantially planar surface of the wire mesh current collector 1620 and each occupying a perimeter surface region thereof, and surrounding a corresponding one of the layers of electrode slurry 1650. FIG. 16C is a schematic illustration of a cross-section (taken along line 16C-16C) of the double-sided wire mesh electrode assembly of FIG. 16A.

In some embodiments, an electrode can include a current collector having a first planar surface and a second planar surface. The current collector can be a mesh current collector (e.g., mesh current collector 1620) or any other current collector described herein. A first barrier is disposed on the first planar surface of the current collector and defines a first inner region, and a second barrier is disposed on the second planar surface of the current collector and defines a second inner region. A first electrode material is disposed in the first inner region and a second electrode material is disposed in the second inner region. In some embodiments, the first electrode material is the same as the second electrode material. In some embodiments, the current collector is a bipolar current collector and the first electrode material is different than the second electrode material.

Figure 17B:
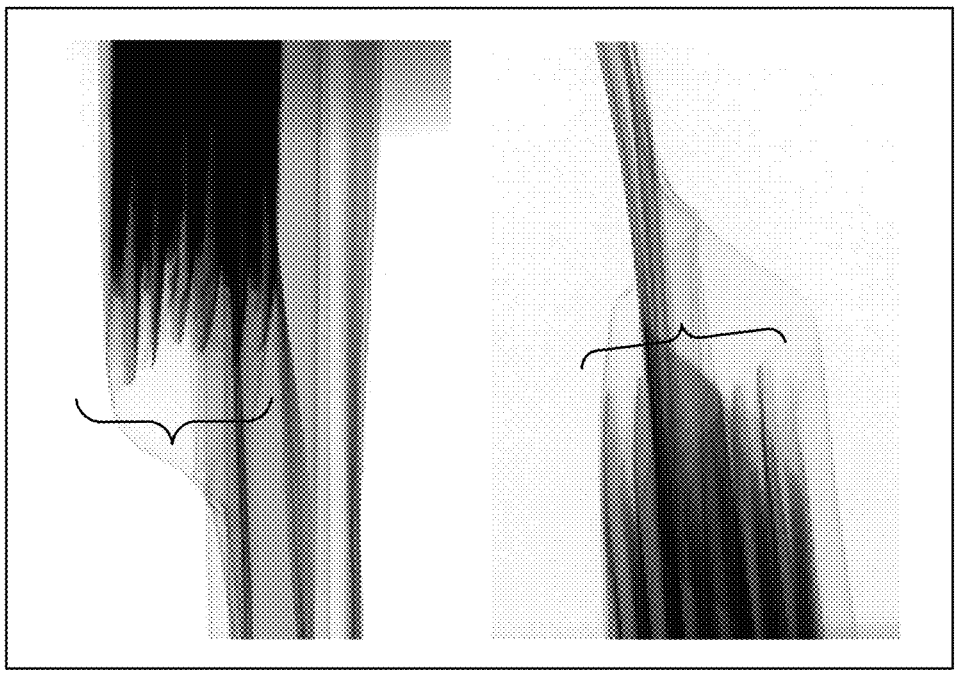
FIG. 17B shows cross-sectional views of an electrochemical cell that includes a barrier member.
Figure 17A:
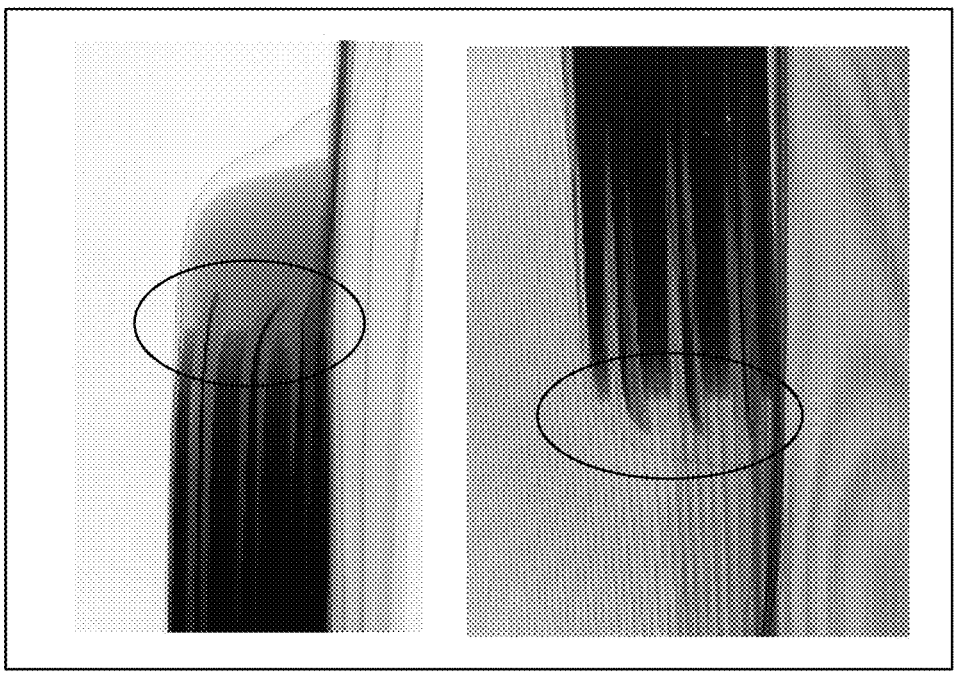
FIG. 17A shows cross-sectional views of an electrochemical cell that does not include a barrier member.

FIG. 17A shows cross-sectional views, obtained via 3-D laser scanning, of an electrochemical cell that does not include a barrier member. As shown in the areas indicated by circles, the foil current collector/electrode slurry layers are bending at their edges. By contrast, FIG. 17B shows cross-sectional views, obtained via 3-D laser scanning, of an electrochemical cell that includes a barrier member. As shown in the areas indicated by bracketing, the foil current collector/electrode slurry layers are better supported, with reduced bending at their edges.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, although various embodiments have been described as having particular features and/or combination of components, other embodiments are possible having any combination or sub-combination of any features and/or components from any of the embodiments described herein. For example, although some embodiments of the electrochemical cells were described as being prismatic, in other embodiments, the electrochemical cells can be curved, bent, wavy, or have any other shape. In addition, the specific configurations of the various components can also be varied.

For example, the size and specific shape of the various components can be different than the embodiments shown, while still providing the functions as described herein.

The invention claimed is:

1. An electrode, comprising:
   a current collector having a planar surface;
   a barrier disposed on the planar surface of the current collector, the barrier having an inner surface defining an inner region; and
   a semi-solid electrode material disposed in the inner region of the current collector, the semi-solid electrode material including a suspension of an active material and a conductive material in a non-aqueous liquid electrolyte, the semi-solid electrode material having a thickness greater than a thickness of the barrier,
   wherein the barrier contains the semi-solid electrode material in the inner region, and
   wherein the inner surface of the barrier contacts and provides edge support for the semi-solid electrode material.

2. The electrode of claim 1, wherein the barrier is disposed around a perimeter of the planar surface.

3. The electrode of claim 1, wherein the barrier has a thickness from about 0.5 μm to about 600 μm.

4. The electrode of claim 1, wherein after the barrier is disposed on the planar surface of the current collector, a portion of the barrier is removed to form a discontinuous barrier.

5. The electrode of claim 1, wherein the barrier is chemically resistant to degradation by the non-aqueous liquid electrolyte.

6. The electrode of claim 1, wherein the barrier is one of a UV-cured epoxy, a light-cured acrylic, an adhesive, a plastic, a mechanical frame, and a cured liquid material.

7. The electrode of claim 1, wherein the barrier includes one of an inorganic material and a ceramic fiber.

8. The electrode of claim 7, wherein the inorganic material includes at least one of $SiO_2$, $SiO$, $Al_2O_3$, Zirconia, $AlO(OH)_2$, $MgO$, and $Mg(OH)_2$.

9. The electrode of claim 1, wherein the barrier has a nonzero width of about 3 mm or less.

10. An electrode, comprising:
    a current collector having a planar surface;
    a barrier disposed around a perimeter of the planar surface of the current collector, the barrier having an inner surface defining an inner region; and
    a semi-solid electrode material disposed in the inner region of the current collector, the semi-solid electrode material including a suspension of an active material and a conductive material in a non-aqueous liquid electrolyte,
    wherein the barrier has a nonzero width of about 3 mm or less and has a thickness that is less than a thickness of the semi-solid electrode material disposed in the inner region,
    wherein the inner surface of the barrier contacts and provides edge support for the semi-solid electrode material.

11. The electrode of claim 10, wherein the barrier is chemically resistant to degradation by the non-aqueous liquid electrolyte.

12. The electrode of claim 10, wherein the barrier substantially limits migration of electrolyte.

13. The electrode of claim 10, wherein the barrier is continuous.

14. The electrode of claim 10, wherein the barrier substantially encloses the semi-solid electrode material.

15. An electrode, comprising:
    a current collector having a planar surface;
    a barrier disposed around a perimeter of the planar surface of the current collector, the barrier having an inner surface defining an inner region; and
    a semi-solid electrode material disposed in the inner surface of the current collector, the semi-solid electrode material including a suspension of an active material and a conductive material in a non-aqueous liquid electrolyte,
    wherein the barrier contains the semi-solid electrode material in the inner region,
    wherein the inner surface of the barrier contacts and provides edge support for the semi-solid electrode material, and
    wherein the barrier has a thickness less than a thickness of the semi-solid electrode material.

16. The electrode of claim 15, wherein the barrier substantially limits migration of electrolyte.

17. The electrode of claim 15, wherein the barrier substantially encloses the semi-solid electrode material.

18. An electrode, comprising:
    a current collector having a first planar surface and a second planar surface;
    a first barrier disposed on the first planar surface of the current collector, the first barrier having an inner surface defining a first inner region; and
    a first semi-solid electrode material disposed in the first inner region of the current collector, the first semi-solid electrode material including a suspension of an active material and a conductive material in a non-aqueous liquid electrolyte,
    wherein the inner surface of the first barrier contacts and provides edge support for the first semi-solid electrode material; and
    a second barrier disposed on the second planar surface of the current collector, the second barrier having an inner surface defining a second inner region; and
    a second semi-solid electrode material disposed in the second inner region of the current collector, the second semi-solid electrode material including a suspension of an active material and a conductive material in a non-aqueous liquid electrolyte,
    wherein the inner surface of the second barrier contacts and provides edge support for the second semi-solid electrode material, and
    wherein the first barrier has a thickness that is less than a thickness of the first semi-solid electrode material disposed in the first inner region and the second barrier has a thickness that is less than a second thickness of the second semi-solid electrode material disposed in the second inner region.

19. The electrode of claim 18, wherein the first semi-solid electrode material is the same as the second semi-solid electrode material.

20. The electrode of claim 18, wherein the current collector is a bipolar current collector and the first semi-solid electrode material is different than the second semi-solid electrode material.

21. The electrode of claim 1, wherein the barrier is discontinuous.

22. The electrode of claim 21, wherein the discontinuous barrier includes a plurality of gaps are formed between adjacent regions of the barrier.

* * * * *

UNITED STATES PATENT AND TRADEMARK OFFICE
CERTIFICATE OF CORRECTION

PATENT NO. : 10,593,952 B2
APPLICATION NO. : 15/157843
DATED : March 17, 2020
INVENTOR(S) : Ota et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 242 days.

Signed and Sealed this
Twenty-fourth Day of November, 2020

Andrei Iancu
*Director of the United States Patent and Trademark Office*